Nov. 8, 1949 W. L. HANSEN ET AL 2,487,543
SPEED CONTROL MECHANISM FOR ELECTRIC MOTORS
Filed Aug. 2, 1944 2 Sheets-Sheet 1

INVENTORS
WILLIAM L. HANSEN
IRA N. HURST
BY
Toulmin & Toulmin
ATTORNEYS

Nov. 8, 1949 W. L. HANSEN ET AL 2,487,543
SPEED CONTROL MECHANISM FOR ELECTRIC MOTORS
Filed Aug. 2, 1944 2 Sheets-Sheet 2

INVENTORS
WILLIAM L. HANSEN
BY IRA N. HURST
Toulmin & Toulmin
ATTORNEYS

Patented Nov. 8, 1949

2,487,543

UNITED STATES PATENT OFFICE 2,487,543

SPEED CONTROL MECHANISM FOR ELECTRIC MOTORS

William L. Hansen and Ira N. Hurst, Princeton, Ind., assignors to Hansen Manufacturing Company, Inc., Princeton, Ind., a corporation of Indiana Application August 2, 1944, Serial No. 547,714

5 Claims. (Cl. 200—80)

1

The present invention relates to electric motors and more particularly to speed control apparatus therefor.

There is a distinct need in the art for a simple but effective mechanism for controlling the speed of direct current motors and have the control operate so effectively that the speed of the motor is maintained closely constant, regardless of fluctuations in the line voltage and changes in the load. In certain types of installations, particularly in connection with airplane accessories and operating mechanisms which require the use of direct current motors, it is absolutely vital that the motor shall run for long periods of time at a strictly constant speed. This is indeed a tremendous job when it is considered that such motors, in the case of an airplane, must be run from storage batteries which are in various states of charge or discharge and considerable variation in the load may be present due to changes in the mechanical conditions within and atmospheric conditions without the airplane.

The primary object of the invention is to provide an automatic speed regulator of efficient but inexpensive design that will maintain a strict constancy of speed of a direct current motor which is being used for drive or control purposes.

Another object is to provide a constant speed control for direct current motors which is equally applicable to the field and armature of a motor or a generator.

Still another object is to provide a speed control mechanism of the type referred to and in which the point in the speed curve at which the control mechanism cuts in or out may be readily adjusted so as to accommodate all changes in speed that may be desired or necessary.

The above objects are attained in brief by providing a centrifugally operated switch which is mounted on the rotating element and can be connected as to affect either the armature or the field winding of the motor or both, in order to obtain the desired speed adjustment.

The invention will be better understood when reference is made to the following description and the accompanying drawings, in which.

2

Figure 4:
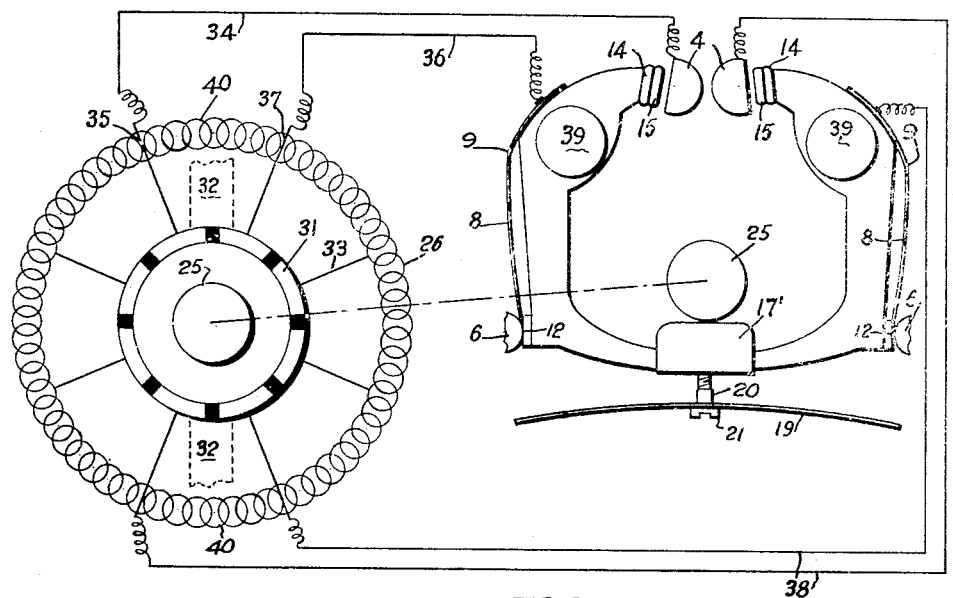

Figure 4 shows a circuit diagram including the armature of a direct current motor connected to the improved speed control switch.

Figure 5:
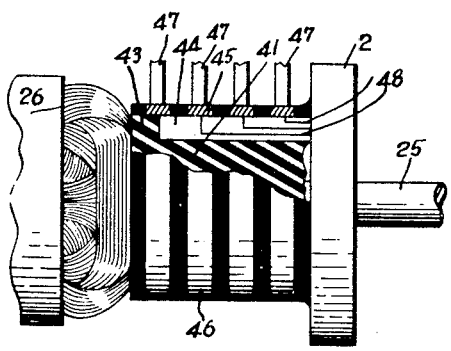

Figure 5 is a fragmentary end view of an armature to which a speed control mechanism has been secured for operating on the stationary field circuit of the motor.

Figure 6:
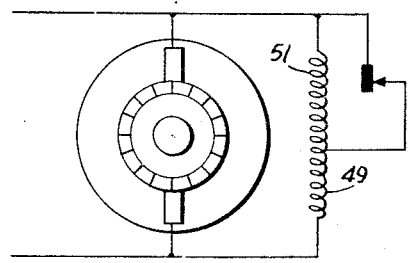
Figure 7:
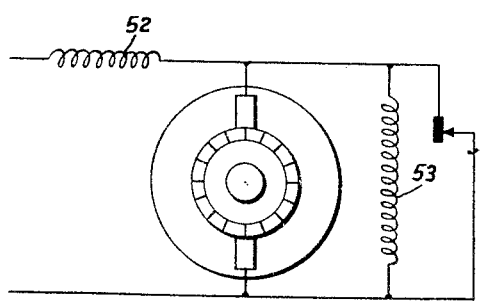

Figure 6 is a schematic diagram showing the application of the invention to the shunt field of a direct current motor, while Figure 7 applies the speed control mechanism to the shunt field portion of a compound-wound motor.

Figure 2:
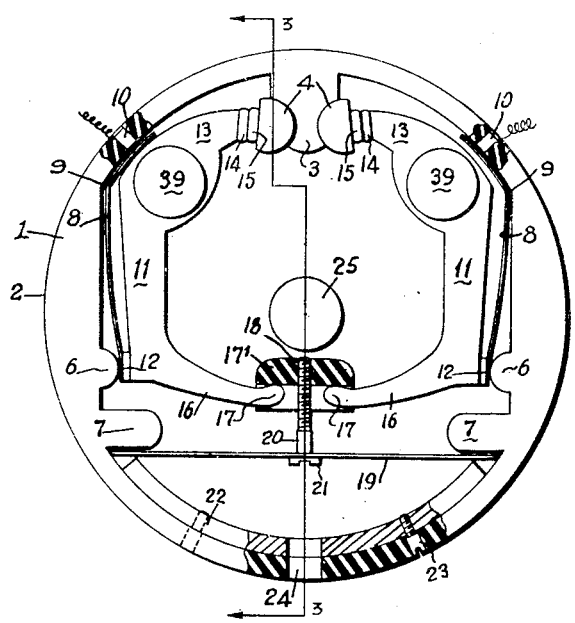
Figure 2 is an end view of this mechanism shown as a section in enlarged form taken along line 2—2 in Figure 1.
Figure 3:
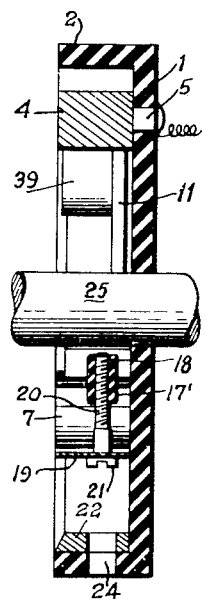
Figure 3 is a transverse sectional view taken along line 3—3 in Figure 2.

Referring more particularly to Figures 2 and 3, reference character 1 designates a circular plate of any suitable insulating material having a flanged edge 2. There is a projection 3 extending inwardly and radially from the outside rim, which serves as a support for a pair of stationary contacts 4. These contacts may have a spherical head which sets snugly in an opening within the projection 3 and is riveted as indicated at 5 to the plate 1. In addition to the projections 3, there are two other projections or knobs 6 and 7 extending from opposite sides of the casing 2 and transversely of the casing. The projections 6 form abutments for spring elements 8, which are bent at 9 and secured to the inner surface of the flange 2 by rivets 10.

A pair of V-shaped arms or levers 11 are secured at each corner 12 to the lower ends of the springs 8 at the position of the projections 6. Each lever is provided with a finger 13 which terminates in a bent up portion 14 for receiving a contact button 15.

The levers 11 at the lower ends are also provided with a pair of inwardly extending legs 16 which have rounded ends 17. These ends are received by a slot or groove formed on the underside of the clamping block 17' of insulating material which is provided with a tapped hole 18.

A spring plate 19 of metal spans the distance between the underside surfaces of the projection 7 and a screw 20 having a head 21 effectively secures the block 17' to the metal strip 19. An arcuate band of metal 22 extends around the lower inner surface of the flange 2 and is of such length as to hold the strip 19 firmly against the underside of the projection 7. The strip may be secured to the flange 2 by a pair of screws 23. An opening 24 is provided in the flange 2 and the metal band 22 to permit the application of a screw driver to the head 21. The strip 19 is firmly held in position by the projection 7 and the arcuate member 22, and any tightening of the screw 20 within the block 17' causes the legs 14 to move downwardly about fulcrums formed of the knobs 6 and thus cause the contact pieces 15 to press against the adjacent contacts 4.

Each lever is suspended from the flange 2 of the casing by the spring 8 which tends to press the legs inwardly so that when the screw 20 is loosened the legs 16 are also caused to move upwardly, resulting in the separation of the contacts. The screw 20 therefore effectively serves to regulate the pressure at the contacts 15 and 4. The pressure regulating effect of the spring piece 19 is shown in Figure 4, wherein it will be noted that there is a space existing between the two pairs of contacts at each side of the switch.

Figure 1:
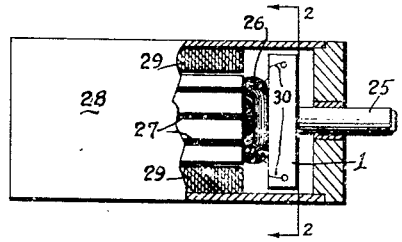
Figure 1 represents the front elevational view, partly in section, of a direct current motor provided with the improved speed control mechanism.

The switch as a whole is mounted on the motor shaft 25 shown in Figure 1, with the flange portion 2 directed toward the armature windings 26. These windings are arranged in slots 27 formed in the laminations of the armature, and the latter is adapted to rotate within a metal casing 28. A pair of oppositely disposed field magnets 29 is secured to the casing directly adjacent the armature 27, as is well understood in the art. The armature 27 terminates in a commutator (Figure 4) on which rides a pair of oppositely disposed brushes for conducting current to the armature windings. Connections 30 (Figure 1) are taken from the switch to the armature windings. The armature shaft is suitably journaled in the casing at opposite ends thereof.

The electrical connections between the switch and the armature windings are more clearly shown in Figure 4. In this figure, reference character 31 designates the commutator, and the brushes are indicated at 32 at opposite sides thereof. Connections 33 are taken from suitable taps on the winding 26 to their respective commutator segments. A conductor 34 is connected between the stationary contact 4 and a tap 36 on the armature winding while a conductor 36 extends between spring 8 to another tap 37 on the winding. Conductors 38 may also be taken from separate taps on opposite sides of the armature winding and the stationary contact 4 and spring 8 at the other side of the switch.

It is apparent that as the motor shaft 25 rotates faster than a predetermined speed due to any cause, for example, a temporary increase in the line voltage applied to the armature winding or a temporary reduction in the load applied to the motor shaft, the increased centrifugal effect acting on the levers 11 will overcome the flexing effects at the spring 19 and will cause the levers to swing about the springs 8 to open the contacts at terminals 15 and 4 on each side of the switch. In order to increase the extent of this outward movement, and therefore, the separation of the contacts by reason of centrifugal effect we may attach cylindrical weights 39 to the levers 11. This action open-circuits the oppositely disposed armature coils which under certain circumstances has the effect of reducing the speed of the motor. When the speed slackens, the levers 11 will swing in the opposite direction about the spring members 8 to close the contacts 15, 4 and therefore serve to re-insert the armature coils 40 in the circuit.

It will be understood by those skilled in the art that the effect on the speed of the motor depends on the electrical characteristics of the windings in the terms of their resistance and generated counter-electromotive force. It is possible therefore, depending on the design of the armature windings which are open-circuited at the switch when speed of the motor becomes excessive to cause the motor to reduce its speed under such circumstances. It is further apparent that by adjusting the screw 20 the point in the speed characteristic of the motor at which the two levers of the switch will kick in or out may be nicely regulated in order to obtain a close constancy of motor speed, regardless of fluctuations in the line voltage or changes in the shaft load. The absence of pivots on the levers 11 which normally give rise to friction also tends to increase the sensitivity of the regulator.

In Figure 6, we have shown the application of our improved switch in connection with a shunt field motor while Figure 5 illustrates the use of slip rings by which the centrifugally operated switch may be employed for controlling the stationary field circuit of a motor. The switch proper is generally indicated at 2 (Figure 5) and as in the case of the other figures the switch is secured to the motor shaft 25. A cylinder 41 of insulating material is interposed between the armature windings 26 and the flanged edge 2 of the switch, the cylinder being secured to the shaft. The cylinder may be flanged as indicated at 43 so as to leave a recess 44. A sleeve 45 is fitted over the flange 43 and secured if desired, to the inner edge of the switch 2 to form a unitary member. This sleeve is composed of alternate rings of insulating and conducting material, the latter constituting slip rings 46. Brushes 47 bear against the slip rings and connections from these brushes are taken to taps on the motor field, as exemplified in Figures 6 and 7. The slip rings are connected through conductors 48 to the contacts 4 and 15 of the centrifugally operated switch. Thus, when the motor rotates at an excessive speed so as to open these contacts, the field circuit will be so modified as to increase the field strength and thereby decrease the speed of the motor.

A suitable arrangement for accomplishing this purpose is illustrated in Figure 6, in which a shunt field winding is indicated as 49 and a portion thereof is short-circuited by the switch 2 whenever contact is made between the elements 4 and 15. Consequently, as the speed of the motor becomes greater than a predetermined speed, the contacts open and the short circuit is temporarily removed so as to add the extra magnetic field of the coil 51, to the original field 49. The speed of the motor is therefore decreased.

In Figure 7, we have shown the application of our improved centrifugal switch to a compound-wound motor exemplified by a series field 52 and a shunt field 53. The switch 2 is connected across the entire shunt field so as to cut out this field when the speed of the motor is normal and the centrifugal switch contacts remains in a closed condition. However, as the motor speed increases, i. e., becomes greater than a predetermined speed, the short circuit across the field winding is removed at the switch to add the effect of the shunt field to the series field and thus to reduce the speed of the motor.

While we have described our invention as being applied to a motor, it will be understood that the improved centrifugal switch may also be used in connection with electrical generators, in order to maintain the terminal voltage of the generator substantially constant notwithstanding variations in the speed of the prime mover. In this case, the centrifugal switch could be used to insert or remove windings either in the armature or field circuit of the generator to control the generated voltage or if desired, resistance may be added or removed from the output circuit to maintain a constant net voltage. In fact, any combination of circuits, whether in the armature or in the field of either a motor or a generator, may be controlled by the improved switch, using well known structures such as slip rings for transferring the supervisory effects of the rotating switch to a stationary coil or circuit. By properly designing the various elements of the switch, mainly the length of the lever arms 11 and the flexibility of the springs 8, a high degree of sensivity of speed control can be attained by the improved structure. It is also evident that the switch is fairly simple and inexpensive to make and, also easy to install and repair since it merely has to be dismounted from the shaft 25.

It will be understood that we desire to comprehend within our invention such modifications as come within the scope of the claims and the invention.

Having thus fully described our invention what we claim as new and desire to secure by Letters Patent is:

1. In a centrifugal control switch, a rotary body to be driven by the apparatus to be controlled, a pair of contacts fixed on said rotary body, a pair of movable contacts each on a pair of movable levers, resilient spring means connected to said body and said levers providing the sole means for movably mounting said levers on said body, counterweight means on each of said levers responsive to the rate of rotation of said body to open said contacts on said body and said levers, and resilient means engaging said levers for normally urging said levers to contact closed position.

2. In a centifugal control switch, a rotary body to be driven by the apparatus to be controlled, a pair of contacts fixed on said rotary body, a pair of movable contacts each on a pair of movable levers, resilient spring means connected to said body and said levers providing the sole means for movably mounting said levers on said body, counterweight means on each of said levers responsive to the rate of rotation of said body to open said contacts on said body and said levers, and resilient means engaging said levers for normally urging said levers to contact closed position, means for adjusting the relative tension of said last mentioned resilient means.

3. In a centrifugal switch, a rotatable body adapted to be driven by the member to be controlled, a pair of contacts fixed on said body, a pair of levers, contacts on said levers adapted to engage said fixed contacts on said body, spring means fixed to said body and having one of their ends fixed to said body and their other ends fixed to said levers so as to provide the sole means for movably supporting said levers on said body, counterweight means on each of said levers responsive to the rate of rotation of said body to swing said levers outwardly to disengage said contacts, fulcrum of abutment means on said body engaging said spring means adjacent the point of connection of said spring means with said levers to provide a rocking fulcrum for said levers.

4. In a centrifugal switch, a rotatable body adapted to be driven by the member to be controlled, a pair of contacts fixed on said body, a pair of levers, contacts on said levers adapted to engage said fixed contacts on said body, spring means fixed to said body and having one of their ends fixed to said body and their other ends fixed to said levers so as to provide the sole means for movably supporting said levers on said body, counterweight means on each of said levers responsive to the rate of rotation of said body to swing said levers outwardly to disengage said contacts, fulcrum of abutment means on said body engaging said spring means adjacent the point of connection of said spring means with said levers to provide a rocking fulcrum for said levers, and means for conducting electrical current to the contacts on said levers through said spring means.

5. In a centrifugal switch, a rotatable body adapted to be driven by the member to be controlled, a pair of contacts fixed on said body, a pair of levers, contacts on said levers adapted to engage said fixed contacts on said body, spring means fixed to said body and having one of their ends fixed to said body and their other ends fixed to said levers so as to provide the sole means for movably supporting said levers on said body, counterweight means on each of said levers responsive to the rate of rotation of said body to swing said levers outwardly to disengage said contacts, fulcrum of abutment means on said body engaging said spring means adjacent the point of connection of said spring means with said levers to provide a rocking fulcrum for said levers, and means for conducting electrical current to the contacts on said levers through said spring means, and means for normally urging said levers to contact engaged positions including means for varying the force exerted by said last mentioned means in opposing the force exerted by said counterweights upon rotation of the switch body.

WILLIAM L. HANSEN.
IRA N. HURST.

REFERENCES CITED

The following references are of record in the file of this patent:

UNITED STATES PATENTS

| Number | Name | Date |
|---|---|---|
| 407,293 | Higham | July 16, 1889 |
| 420,469 | Serrell et al. | Feb. 4, 1890 |
| 685,852 | Kragh | Nov. 5, 1901 |
| 1,057,436 | Leeds | Apr. 1, 1913 |
| 1,994,626 | Townsend | Mar. 19, 1935 |
| 2,144,733 | Jeppsson | Jan 24, 1939 |